United States Patent
Gerring

(10) Patent No.: US 8,162,787 B2
(45) Date of Patent: Apr. 24, 2012

(54) ONE-WAY CLUTCHED DAMPER FOR AUTOMATIC BELT TENSIONER

(75) Inventor: Douglas G. Gerring, Hartland, MI (US)

(73) Assignee: Dayco Products, LLC, Miamisburg, OH (US)

(*) Notice: Subject to any disclaimer, the term of this patent is extended or adjusted under 35 U.S.C. 154(b) by 410 days.

(21) Appl. No.: 11/514,138

(22) Filed: Aug. 31, 2006

(65) Prior Publication Data

US 2008/0058140 A1  Mar. 6, 2008

(51) Int. Cl.
  *F16H 7/12* (2006.01)
(52) U.S. Cl. .......................... 474/133; 188/82.84; 192/45
(58) Field of Classification Search .................. 474/135; 188/82.84; 192/45
  See application file for complete search history.

(56) References Cited

U.S. PATENT DOCUMENTS

| | | | |
|---|---|---|---|
| 2,055,197 A | | 9/1936 | Gasstrom |
| 2,145,008 A | | 1/1939 | Jagersberger |
| 2,372,026 A | * | 3/1945 | Smith ........................ 188/82.84 |
| 2,569,108 A | * | 9/1951 | Koch ......................... 188/82.84 |
| 2,931,476 A | | 4/1960 | Zeidler et al. |
| 3,055,471 A | | 9/1962 | Warn et al. |
| 3,487,900 A | | 1/1970 | Dahl |
| 3,537,555 A | | 11/1970 | Reister et al. |
| 3,625,324 A | | 12/1971 | Scharf |
| 3,937,311 A | * | 2/1976 | Gehrke ........................... 192/45 |
| 3,958,678 A | | 5/1976 | Jeter |
| 4,176,733 A | * | 12/1979 | Twickler ....................... 188/134 |
| 4,372,433 A | | 2/1983 | Mitchell et al. |
| 4,392,840 A | * | 7/1983 | Radocaj ........................ 474/117 |
| 4,415,072 A | * | 11/1983 | Shoji et al. ...................... 192/45 |
| 4,464,147 A | * | 8/1984 | Foster ............................ 474/135 |
| 4,557,709 A | * | 12/1985 | St. John ........................ 474/117 |
| 4,583,962 A | | 4/1986 | Bytzek et al. |
| 4,596,538 A | * | 6/1986 | Henderson .................... 474/135 |
| 4,822,322 A | * | 4/1989 | Martin .......................... 474/135 |
| 4,832,665 A | | 5/1989 | Kadota et al. |
| 4,834,694 A | * | 5/1989 | Martin .......................... 474/135 |
| 4,886,482 A | * | 12/1989 | Koschmieder et al. ........ 474/133 |
| 4,923,435 A | * | 5/1990 | Kadota et al. ................. 474/112 |

(Continued)

FOREIGN PATENT DOCUMENTS

WO  WO2004109247 A2  12/2004

OTHER PUBLICATIONS

PCT, International Search Report, International Application No. PCT/US2007/018874 (mailed Aug. 25, 2008; published Mar. 6, 2008).

(Continued)

*Primary Examiner* — Robert Siconolfi
*Assistant Examiner* — James Hsiao
(74) *Attorney, Agent, or Firm* — Thompson Hine LLP

(57) ABSTRACT

A new asymmetrically damped tensioner is provided utilizing a roller clutch engaged with a tensioner arm through a frictional contact. During normal operation, the roller clutch enables the tensioner arm to pivot in a first direction to take up belt slack with negligible frictional damping applied to the motion of the tensioner arm. When the tensioner arm pivots in a second direction, away from the belt, however, in a condition commonly known as wind-up, the roller clutch engages and creates a frictional linkage between the tensioner arm and a fixed surface. This frictional linkage provides asymmetric frictional damping to the tensioner to limit movement in the second direction and combat wind-up.

19 Claims, 4 Drawing Sheets

U.S. PATENT DOCUMENTS

| | | | |
|---|---|---|---|
| 5,048,651 A | 9/1991 | Lederman | |
| 5,152,726 A | 10/1992 | Lederman | |
| 5,558,370 A | 9/1996 | Behr | |
| 5,598,913 A * | 2/1997 | Monahan et al. | 192/41 S |
| 5,638,931 A * | 6/1997 | Kerr | 192/45 |
| 5,662,197 A | 9/1997 | Tabe | |
| 6,073,741 A | 6/2000 | Liu | |
| 6,129,189 A * | 10/2000 | Kerr | 192/45 |
| 6,135,255 A * | 10/2000 | Myers | 192/45 |
| 6,231,465 B1 | 5/2001 | Quintus | |
| 6,328,147 B1 * | 12/2001 | Fujita | 192/70.23 |
| 6,375,588 B1 | 4/2002 | Frankowski et al. | |
| 6,422,962 B1 | 7/2002 | Lehtovaara et al. | |
| 6,478,118 B2 | 11/2002 | Astrom et al. | |
| 6,554,318 B2 | 4/2003 | Kohut et al. | |
| 6,575,860 B2 * | 6/2003 | Dutil | 474/135 |
| 6,592,482 B2 * | 7/2003 | Serkh | 474/135 |
| 6,655,516 B2 * | 12/2003 | Nakamura et al. | 192/45 |
| 6,834,631 B1 | 12/2004 | Blackburn et al. | |
| 6,861,765 B2 * | 3/2005 | Taniguchi | 290/40 R |
| 6,932,731 B2 * | 8/2005 | Kaiser et al. | 474/135 |
| 7,004,865 B2 * | 2/2006 | Berndt et al. | 474/135 |
| 7,371,199 B2 * | 5/2008 | Joslyn | 474/135 |
| 8,038,555 B2 | 10/2011 | Pendergrass et al. | |
| 2002/0119850 A1 * | 8/2002 | Dutil | 474/135 |
| 2003/0008739 A1 | 1/2003 | Asbeck et al. | |
| 2003/0119616 A1 * | 6/2003 | Meckstroth et al. | 474/135 |
| 2003/0153421 A1 | 8/2003 | Liu | |
| 2004/0072643 A1 * | 4/2004 | Berndt et al. | 474/135 |
| 2005/0059518 A1 * | 3/2005 | Joslyn | 474/135 |
| 2005/0184184 A1 * | 8/2005 | Kohlndorfer et al. | 242/374 |
| 2005/0199462 A1 * | 9/2005 | Gamache | 192/12 B |

OTHER PUBLICATIONS

PCT, Written Opinion, International Application No. PCT/US2007/018874 (mailed Aug. 25, 2008).

\* cited by examiner

ONE-WAY CLUTCHED DAMPER FOR AUTOMATIC BELT TENSIONER

TECHNICAL FIELD

The present invention relates generally to tensioners and more particularly to an asymmetrically damped tensioner utilizing a ball/ramp clutch operatively engaged with the tensioner arm through a friction damper.

BACKGROUND

It is common for a belt tensioner to have a means to dampen movement of the tensioner arm caused by belt tension fluctuation. The required magnitude of this damping depends on many drive factors including geometry, accessory loads, accessory inertia, engine duty cycle and others. For instance, drive systems that have higher torsional input or certain transient dynamic conditions may require higher damping to sufficiently control tensioner movement. Although higher damping is very effective at controlling arm movement, it can also be detrimental to other critical tensioner functions (e.g. slow or no response to slack belt conditions). In addition, variation or change in damping that occur as a result of manufacturing variation, operating temperature and component break-in or wear can also cause the tensioner to be unresponsive.

Timing belt systems have benefited from the use of asymmetric damping to address this problem. An asymmetrically damped tensioner provides damping when additional belt tension is encountered but is free to respond to slack belt conditions. Although asymmetric functionality may not be required for all other front end accessory drive tensioners, the potential for increased service life, solving other transient dynamic system problems including belt slip during a 1-2 gear shift, or simply making the tensioner less sensitive to damping variation make it a desirable design option.

One current solution to this problem uses a viscous linear damper mechanism, such as a shock absorber, attached to a pivoting arm. Asymmetric damping is achieved through, for example, check valves and different orifice sizes in the shock absorber. This solution, however, tends to be expensive and requires more packaging space than a conventional tensioner. Other solutions use wedges that increase damper friction during wind-up or spring loaded self-energizing brake shoe elements. These designs, however, tend to be complex with many small parts to assemble.

One-way clutch mechanisms have been proposed, for example in U.S. Pat. Nos. 4,583,962 and 6,422,962, for timing belt tensioners for the purpose of preventing or limiting back travel to prevent tooth jump. These "ratcheting" tensioners, however, lack the ability to relieve belt tension sufficiently when not required. Other timing belt tensioner proposals including, for example, U.S. Pat. Nos. 4,832,665 and 6,375,588, use a one-way device coupled to a viscous damper. Although these devices offer good functionality, retention of the viscous fluid throughout the service life can be difficult. Yet another design disclosed in U.S. Patent App. Publication 2003/0008739 uses friction generated by the clamping action of a wrap spring clutch to provide damping.

The aforementioned tensioner designs are not ideal. Accordingly, a new tensioner design is desired.

DETAILED DESCRIPTION

Figure 1:
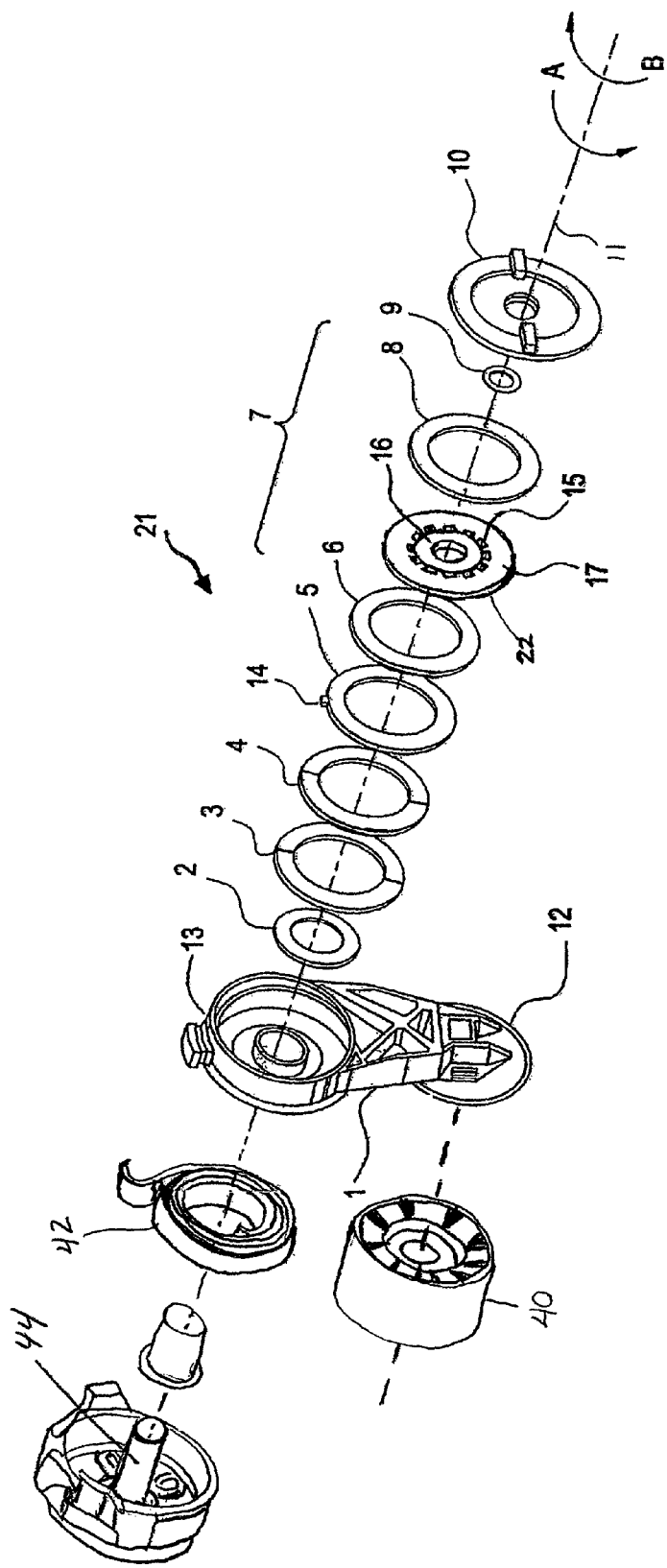
FIG. 1 is an exploded perspective view of a new tensioner according to one embodiment.

The new tensioner disclosed herein uses a one-way, ball-ramp clutch to activate a frictional damper only during wind-up (i.e. untensioning). Wind-up results when increasing belt tension causes the belt to lift the tensioner arm in a direction away from the belt. The present invention resists wind-up with a frictional damping force but does not resist movement of the tensioner arm toward the belt with the same frictional damping force. This characteristic is generally known as asymmetric damping.

The new tensioner herein achieves asymmetric damping in part by the use of a roller, ball, or ball/ramp clutch connected to the tensioner arm through a friction damper. In other words, the roller clutch operates on the tensioner arm indirectly through the friction damper. During normal operation, the roller clutch is not engaged and the tensioner is biased normally using a spring. During wind-up, the roller clutch engages the tensioner arm through a frictional damper to apply additional frictional damping force to resist movement of the tensioner arm away from the belt. Due to the frictional nature of the asymmetric damping, the tensioner will also respond to high belt tension once the frictional force of the damper is overcome, i.e., the tensioner will not restrict all motion in the wind-up direction regardless of the belt tension.

Referring now to the embodiment depicted in FIGS. 1-4, the tensioner 21 includes an arm 1 and a roller clutch 7 that is in frictional contact with the arm 1 and the stator plate or end cap 10. The asymmetric damping is provided by the interactions between the roller clutch and the arm of the tensioner.

The arm 1 is pivotable in a first direction A and a second direction B about a pivot axis 11. As is known in the art, the arm 1 may be biased by, for example, a torsional spring 42 in for example, the first direction A, to tension an associated power transmitting belt or chain. A pulley 40, which is rotatably attached to the distal end 12 of the arm 1, is thereby brought into engagement with the belt with a force to tension the belt. The arm 1 shown in this embodiment also has a ring slot 13 which is a substantially channel shaped cut in the arm 1 with the length substantially aligned with the pivot axis of the arm 1.

In the embodiment depicted in FIGS. 1-4, the tensioner 21 further comprises a bushing 2, wave springs 3 and 4, and stator 5 with ring tab 14. The bushing 2 is centered on the pivot axis of the tensioner. The bushing 2 can be either a separate element in contact with the tensioner arm 1 or integrated into the tensioner arm 1 itself. The next two elements in the embodiment shown are wave springs 3 and 4. In this particular embodiment two wave springs are used to create an axial force inside the assembled tensioner substantially oriented along the pivot axis to urge the elements of the tensioner together. Although two wave springs are used in the embodiment shown in FIGS. 1-4, fewer or greater numbers of springs may be used as needed. Other elements may be substituted for the wave spring, including flanges, bevel washers, and other discrete spring elements in order to provide the desired force. The stator 5 is rotationally fixed to the tensioner arm 1 via the insertion of ring tab 14 on the stator 5 into the ring slot 13 on the tensioner arm 1. The interface between the ring tab 14 and the ring slot 13 substantially eliminates relative rotational movement between the tensioner arm 1 and the stator 5 but still allows axial movement of the stator 5 such that the axial force generated by the wave springs 3 and 4 can be transferred to the remainder of the assembled tensioner. The ring slot 13 is shown in this embodiment as a single element, however multiple ring slots may be used. The use of greater numbers of ring slots may be desirable for a number of reasons including the ability to transfer greater levels of frictional damping from the clutch assembly to the tensioner arm itself. The face of the stator 5 in this embodiment has a frictional surface on the side facing away from the arm 1.

Continuing with FIGS. 1-4 the roller clutch 7 in this embodiment is comprised of the following components: a roller clutch cover 6, a roller clutch assembly 12, and a roller clutch cover 8. The inner face of the roller clutch assembly 22 is covered by a roller clutch cover 6. The roller clutch cover 6 has a friction surface in frictional contact with the stator 5. The opposite face of the roller clutch cover 6 provides a cover for the roller clutch assembly 22. The roller clutch assembly 22 has an inner hub 16 that provides part of the mechanism for the asymmetric operation of the clutch assembly. Interspersed between the inner hub 16 and the outer hub 17 are multiple roller ball bearings 15. The outer hub 17 in this particular embodiment of the invention provides a means for retaining the roller ball bearings 15 inside the roller clutch 7. In other potential embodiments of the invention, the outer hub may provide additional elements for operation of the unit including all of the features required for the asymmetric operation of the roller clutch. The outer face of the roller clutch 7 is covered by another roller clutch cover 8. The face of the roller clutch cover 8 facing the end cap 10 has a friction surface.

The mating frictional surfaces on the stator 5 and the roller clutch cover 6 may take many forms other than the flat face to flat face embodiment depicted. Some examples of alternative physical forms for the interface between the stator 5 and the roller clutch cover 6 can include a cup and cone or ball and socket configuration to maximize surface area, discrete brake pads, and other combinations for creating a surface suitable for a friction interface between the elements to provide frictional damping to the tensioner. The frictional surface itself can be fabricated with numerous processes such as heat and surface treatments, surface etching, and processing coupled with material selection in order to control the friction properties of the interface. The various techniques for creating effective friction contacts betweens parts such as these may be selected by those of ordinary skill in the art.

Figure 5:
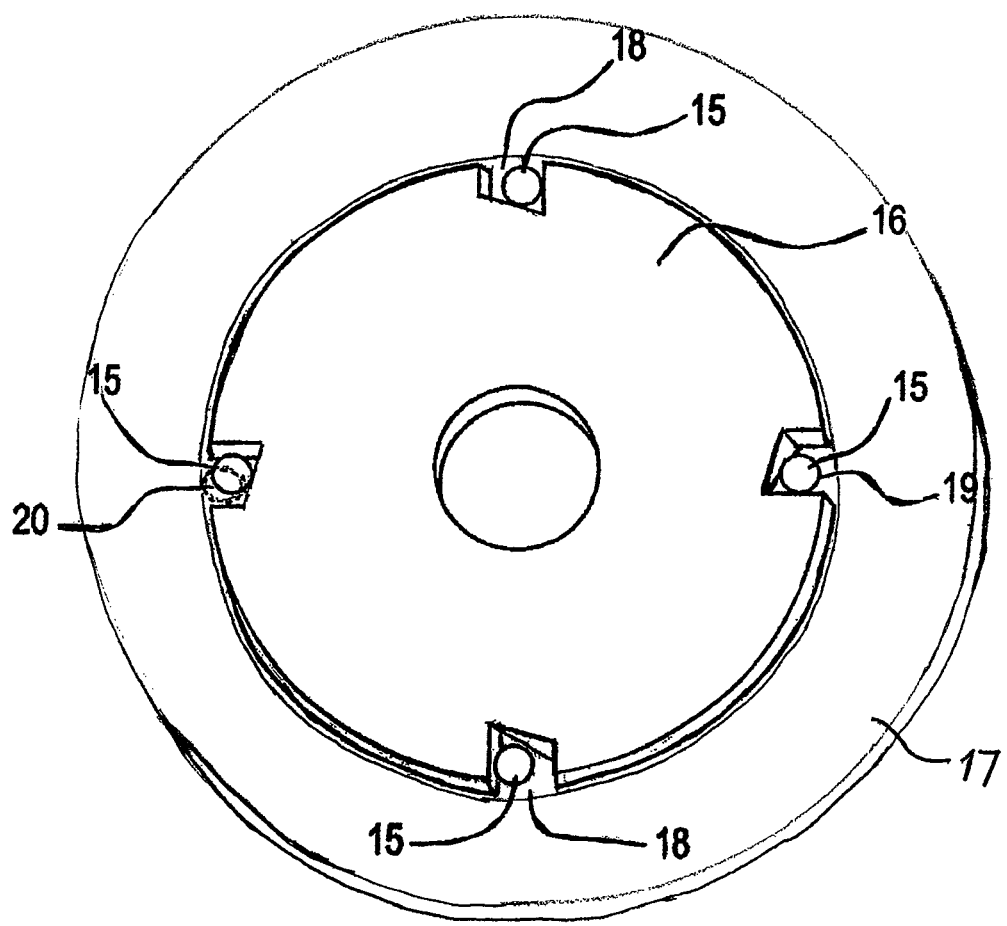
FIG. 5 is a view of one embodiment of part of a roller clutch having the pockets in the inner hub rather than the outer hub.

The roller clutch 7 shown in FIGS. 1-4 has properties familiar to those of ordinary skill in the art. The inner hub 16 and outer hub 17 provide a series of areas for retaining or capturing bearing elements and surfaces for directing the bearing elements during different phases of operation. Referring now to FIG. 5, the inner hub 16 of the roller clutch is detailed. In this alternative embodiment of the invention, the inner hub 16 of the roller clutch provides the primary mechanism for the asymmetric frictional damping for the tensioner. In this view, the inner hub 16 has multiple ball bearing pockets 18 arrayed around its circumference. Each of the ball bearing pockets 18 have a profile where a roller ball bearings 15 can occupy two nominal operating positions, a free rotate position 19 and a brake position 20. In the free rotate position, such as when the tensioner is moving toward the belt, the roller ball bearings 15 are located in the free rotate position 19. In the free rotate position 19, the roller ball bearings 15 provides a roller bearing surface that enables the roller clutch covers 6 and 8 to rotate relative to each other, thus allowing the tensioner to rotate freely.

The brake position 20 in contrast would nominally occur when the tensioner is being urged away from the belt, such as during a wind-up condition. In this embodiment of the invention, when the wind-up condition is occurring, the roller ball bearings 15 are displaced by the inner hub 16 via the profile of the ball bearing pocket 18 into the brake position 20. In the brake position 20, the ball is wedged between the surface of the inner hub 16 and the outer hub 17. This position causes an increased axial load on the tensioner assembly itself, which looking again at FIGS. 1-4, increases the friction between the stator 5 and the roller clutch cover 6, while simultaneously preventing the rotation of the roller clutch covers 6 and 8 relative to each other. This braking position creates a frictional linkage between the arm 1 and the end cap 10 which provides asymmetric frictional damping necessary to combat wind-up of the tensioner 21. There are alternative roller clutch designs that provide substantially the same functionality as the roller clutch highlighted here, namely the ability to freely rotate in one direction and brake in the opposite direction, which can be adopted by one of ordinary skill in the art, to provide asymmetric frictional damping for tensioners.

Although the particular embodiment depicted in FIGS. 1-4 and 5 depicts the use of roller ball bearings, many different types of bearings may be utilized, including, for example, ball, taper, needle, roller, and cylindrical bearings. Additionally the various components of the roller clutch can be fabricated in either fewer or greater numbers of elements. Regardless of the physical structure selected, the roller assembly uses the rolling element and the interaction between the rolling element and the assembly to enable free movement of the tensioner in the tensioning direction and to enable frictional locking during a wind-up condition typified by rotation in the opposite direction.

The embodiment of the tensioner 1 depicted in FIG. 1 is enclosed by an end cap or stator plate 10. The end cap 10 provides a frictional surface against which the roller clutch cover 8 rests. When the tensioner is operating in its normal tensioning position or free pivoting position, the friction interface with the fixed end cap 10 will cause the roller clutch cover 8 to be substantially stationary. However, since the roller ball bearings 15 contained inside the roller clutch are free to rotate, the opposite side of the roller clutch which is frictionally coupled to the arm 1 can rotate freely with minimal friction. Then during a braking condition, the roller ball bearings 15 become wedged in the roller clutch assembly 22 and then urge the roller clutch cover 8 into the end cap 10 and the roller clutch cover 6 into the stator 5 thereby activating both elements and increasing the effective friction at those interfaces. Further, the roller ball bearings 15 are prevented from rolling in the roller clutch 7 thereby engaging the braking capability of the roller clutch 7. The action of the roller clutch 7 thus creates a linkage between the arm 1 to the fixed end cap 10 via frictional surfaces.

Figure 2:
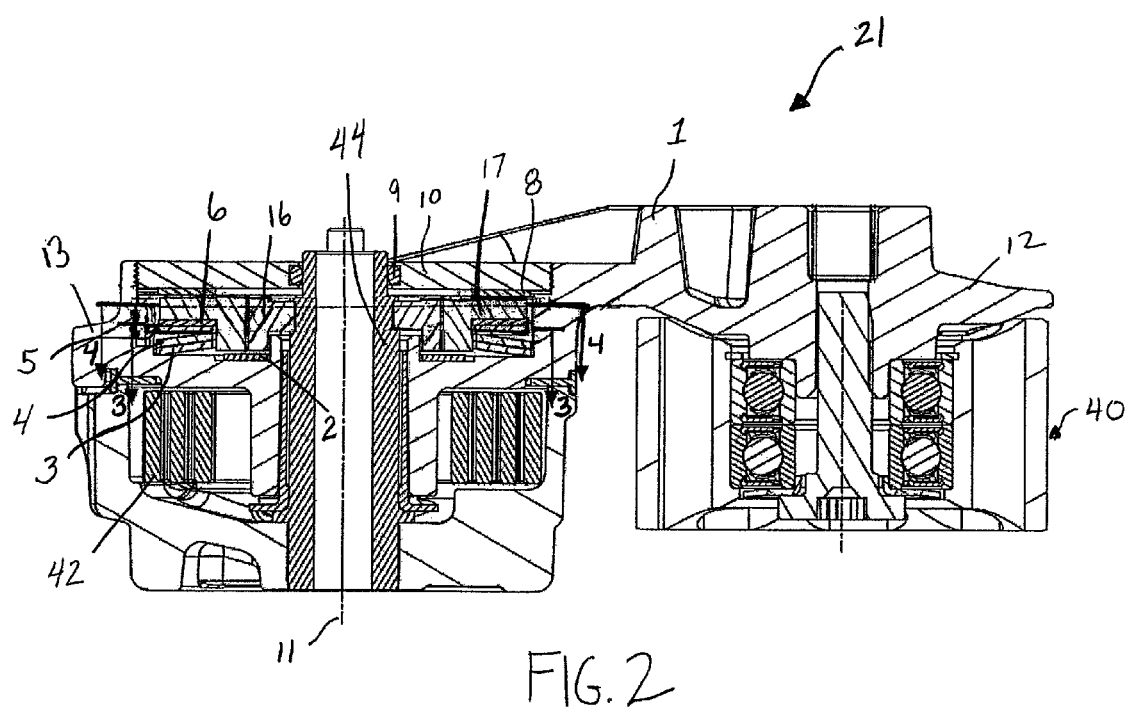
FIG. 2 is an assembled view of the tensioner of FIG. 1.
Figure 3:
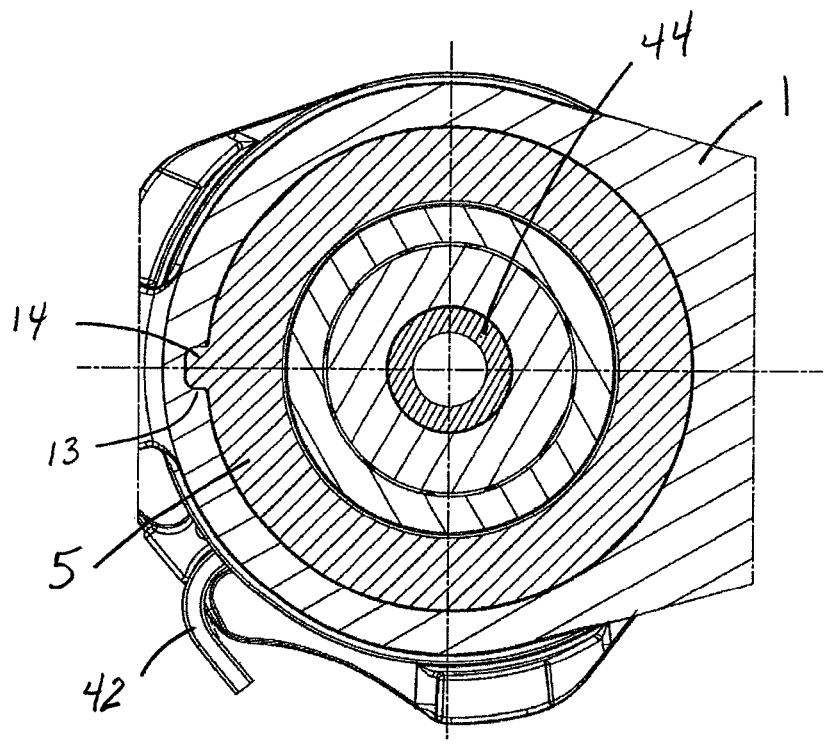
FIG. 3 is a cross-sectional view of the tensioner of FIG. 2 taken along line 3-3.
Figure 4:
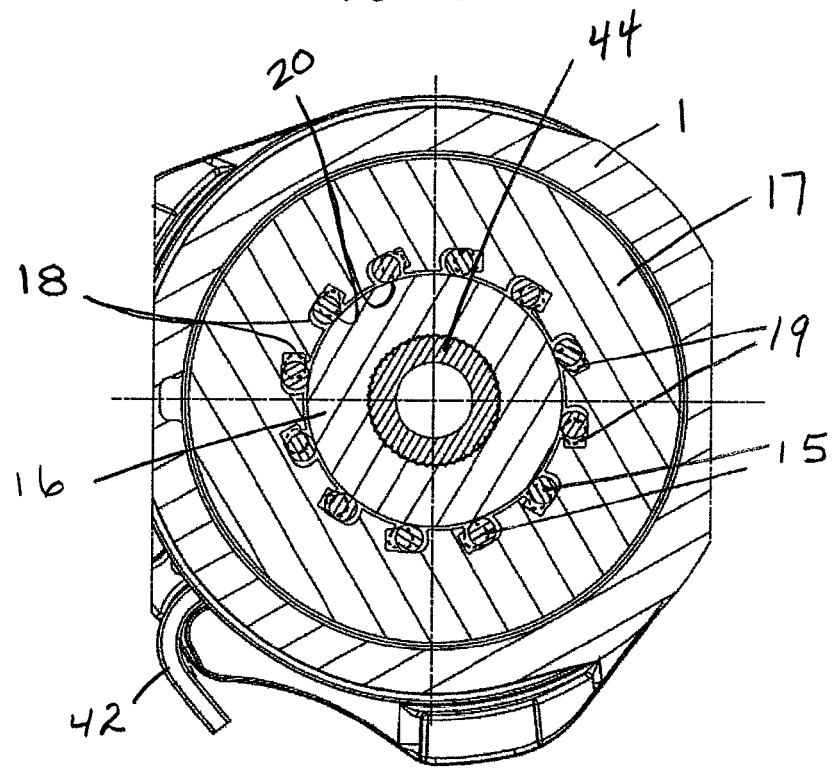
FIG. 4 is a cross-section view of the tensioner of FIG. 2 taken along line 4-4.

In addition to providing a braking or frictional surface, the end cap 10 provides a cover for the tensioner 1. The end cap 10 as shown in the embodiment shown in FIG. 2 is affixed to the structure of the engine or vehicle itself through an axle 44 which runs through the length of the tensioner assembly along the pivot axis 11. Alternatively the end cap may be directly attached to the structure of the engine or the vehicle itself. An o-ring 9 is included in this particular embodiment to protect the internal elements of the tensioner from dust and dirt and optionally to provide a barrier to prevent the escape of lubricant from the inside of the tensioner.

As is evident from the above description and Figures, the tensioners disclosed are operable in at least two conditions. In the first condition the arm 1 is free to pivot toward the belt being tensioned. In this condition the stator 5 which is rotatably connected to arm 1 by the ring tab 14 and the ring slot 13, follows the movement of the tensioner arm 1 toward the belt in the tensioning direction. The ring tab 14 is part of the stator 5 which is in frictional contact with the roller clutch cover 6. The friction contact during normal or free running operation of the tensioner 21 is maintained by the normal force generated by the wave springs 3 and 4. The friction interface between the stator 5 rotatably couples the forces applied to the stator 5 through the ring tab 14 to the roller cover 6 such that the roller cover 6 is urged in the same direction. The movement of the roller clutch cover 6, urges the roller ball bearings 15 to move into (if necessary to change operational modes) and continue rolling within the ball bearing pocket 18 in the free running position 19 shown in FIG. 4 or 5. In this condition the roller clutch cover 6 is free to rotate relative to the other roller clutch cover 8. Thus the roller clutch is disengaged and the tensioner arm is able to move substantially freely toward the belt without significant frictional damping.

The second operable condition occurs when the tensioner arm 1 pivots in a second direction, away from the belt under tension, effectively a wind-up condition. As the tensioner arm 1 pivots, the stator 5 rotates in the second direction as well due to the interface between the ring tab 14 and the ring slot 13 on the tensioner arm 1. The frictional contact between the stator 5 and the roller clutch cover 6 urges the roller clutch cover 6 in the same second direction as the arm 1. The movement of the roller clutch cover 6 urges the roller ball bearings(s) 15 into the brake position 20, shown in FIG. 4 or 5. The movement of the roller ball bearings 15 into the brake position 20 engages the roller clutch 7 thereby simultaneously activating the friction interface between the roller clutch cover 6 and the stator 5 and the roller clutch cover 8 and the end cap 10 thus increasing the friction generated. At the same time, the roller bearings 15 become wedged in place thereby substantially preventing further relative rotation of the roller clutch covers 6 and 8. This creates a friction based linkage between the tensioner arm 1 and the end plate 10 thus creating an asymmetric damping force necessary to combat tensioner wind-up.

If the wind-up forces become large enough to overcome the friction from any of the interfaces between the arm 1 and the end cap 10 such as the stator 5 and the roller clutch cover 6, the roller clutch cover 8 and the end cap 10, or even the roller bearing clutch 7 itself, then the tensioner arm can still break free by overcoming the static friction of the interface(s) and it can continue moving in the wind-up direction. In this manner the tensioner is protected against potential damage to the mechanism caused by extreme wind-up conditions while still providing asymmetric damping suitable to manage normal wind-up experienced during normal engine operation. The selection of friction surfaces, wave spring(s) and the roller clutch design provide the designer with control over the amount of force necessary to overcome the frictional damping. The designer may also select the friction interfaces in such a manner that one interface will preferentially break free.

The embodiments of this invention shown in the drawings and described above are exemplary of numerous embodiments that may be made within the scope of the appended claims. It is contemplated that numerous other configurations of the tensioner assemblies may be created taking advantage of the disclosed approach. In short, it is the applicant's invention that the scope of the patent issuing herefrom be limited only by the scope of the appended claims.

What is claimed is:

1. A tensioner comprising:
   an arm pivotable about a pivot axis in a first direction and a second direction;
   a stator disposed about said pivot axis of said arm and coupled to said arm for rotation therewith about said pivot axis;
   a roller clutch frictionally engaged with said stator by a friction contact; the roller clutch comprising:
   an inner hub;
   an outer hub concentric about the outer periphery of the inner hub; and
   a plurality of roller bearing elements retained between the inner hub and the outer hub with each roller bearing element in a bearing pocket in the outer hub; and
   a biasing element that biases the stator generally along the pivot axis into frictional engagement with the roller clutch;
   wherein the stator rotates with at least the inner hub or the outer hub when the arm rotates in the first direction and rotates relative to the inner hub and the outer hub when the arm rotates in the second direction;
   wherein said roller clutch engages only as the arm rotates in the second direction by wedging the roller bearing elements between the inner hub and the outer hub thereby preventing rotation of the inner hub and the outer hub, which activates increased friction resistance at least at the friction contact from the rotation of the stator relative to the inner hub and the outer hub and-results in a friction force applied to the arm that is axially directed generally parallel to the pivot axis.

2. A tensioner as claimed in claim 1, wherein said roller clutch is operable to rotate substantially freely in said first direction when said arm pivots in said first direction and to substantially not rotate when said arm pivots in said second direction.

3. A tensioner as claimed in claim 1, wherein said stator comprises a tab that is received within a slot in said arm so as to couple the stator to the arm for rotation therewith while permitting the stator to move relative to the arm in a direction parallel to the pivot axis.

4. A tensioner as claimed in claim 1, wherein the biasing element is interposed between said stator and said arm.

5. A tensioner as claimed in claim 1, wherein said plurality of roller bearing elements rotate substantially freely when urged in said first direction and are substantially locked when urged in said second direction.

6. A tensioner as claimed in claim 1, further comprising a stator plate in frictional contact with said roller clutch, wherein said roller clutch is interposed between said stator and said stator plate.

7. A tensioner as claimed in claim 1, wherein said roller clutch comprises a first cover and a second cover, wherein said first cover is in frictional contact with said stator and wherein said second cover is fixed and non-rotatable.

8. A tensioner as claimed in claim 1, wherein said inner hub is fixed and non-rotatable relative to the arm.

9. A tensioner comprising:
   an arm pivotable about a pivot axis in a first direction and a second direction;
   a roller clutch disposed about said pivot axis of said arm and being operatively engaged with said arm through frictional contact; the roller clutch comprising:
   an inner hub;
   an outer hub concentric about the outer periphery of the inner hub; and a plurality of roller elements retained between the inner hub and the outer hub with each roller element in a bearing pocket in the outer hub; and a biasing element biasing a component of the tensioner generally along the pivot axis into frictional engagement with the roller clutch;

wherein the component of the tensioner biased by the biasing element rotates with a portion of the roller clutch in the first direction and rotates relative to said portion of the roller clutch in the second direction;

wherein said roller clutch engages in a brake position only as the arm rotates in the second direction, which activates increased friction resistance at least at the frictional engagement with the roller clutch and results in a friction force applied to the arm that is axially directed generally parallel to the pivot axis.

10. A tensioner as claimed in claim 9, wherein a second portion of said roller clutch is fixed with respect to said arm.

11. A tensioner as claimed in claim 9, wherein said roller elements are within a matching series of pockets that are circumferentially arranged around said pivot axis within said roller clutch.

12. A tensioner as claimed in claim 11, wherein each said matching series of pockets has a first position and a second position for said roller elements, wherein when said roller elements are in said first position said roller clutch rotates substantially freely and when said roller elements are in said second position said roller elements substantially prevent said roller clutch from rotating.

13. A tensioner comprising:

an arm pivotable about a pivot axis in a first direction and a second direction;

a stator disposed about said pivot axis of said arm and coupled to said arm for rotation therewith about said pivot axis;

a roller clutch with a first face and a second face, wherein said first face is frictionally engaged with said stator through a first friction contact;

a stator plate frictionally engaged with said second face through a second friction contact; and a biasing element that biases the stator generally along the pivot axis into frictional engagement with the first face of the roller clutch;

wherein the stator rotates with a portion of the roller clutch when the arm rotates in the first direction and rotates relative to said portion of the roller clutch when the arm rotates in the second direction;

wherein said roller clutch engages in a brake position only as the arm rotates in the second direction, which activates an increased friction resistance at least at the first friction contact from the rotation of the stator relative to the roller clutch and results in a friction force applied to the arm that is axially directed generally parallel to the pivot axis.

14. A tensioner as claimed in claim 13, wherein said roller clutch is comprised of a first cover adjacent to the stator, a second cover adjacent to the stator plate, an outer hub concentric about an inner hub and separated therefrom but in contact therewith through a plurality of roller bearing elements, the inner hub and outer hub being positioned between the first cover and the second cover.

15. A tensioner as claimed in claim 14, wherein said roller bearing elements are ball bearings.

16. A tensioner as claimed in claim 14, wherein said roller clutch is operable in a first condition in which said first cover is substantially free to rotate relative to said second cover and a second condition in which said first cover is substantially prevented from rotating relative to said second cover.

17. A tensioner as claimed in claim 14, wherein said inner hub is affixed to said pivot axis and is non-rotatable relative to the arm.

18. A tensioner as claimed in claim 13, wherein said stator plate is affixed to said pivot axis and is non-rotatable relative to the arm.

19. A tensioner as claimed in claim 13, wherein said stator comprises a tab that is received within a slot in said arm so as to couple the stator to the arm for rotation therewith while permitting the stator to move relative to the arm in a direction parallel to said pivot axis.

* * * * *